US012750402B2

(12) United States Patent
Sahu et al.

(10) Patent No.: US 12,750,402 B2
(45) Date of Patent: Sep. 29, 2026

(54) SYSTEM AND METHOD FOR OBSERVING ENCRYPTED TRAFFIC IN JAVA APPLICATIONS USING EBPF AND JAVA AGENT

(71) Applicant: Harness Inc., San Francisco, CA (US)

(72) Inventors: Santosh Sahu, Bangalore (IN); Puneet Agarwal, Bangalore (IN); Sanjay Nagraj, Dublin, CA (US)

(73) Assignee: Harness Inc., San Francisco, CA (US)

( * ) Notice: Subject to any disclaimer, the term of this patent is extended or adjusted under 35 U.S.C. 154(b) by 105 days.

(21) Appl. No.: 18/762,690

(22) Filed: Jul. 3, 2024

(65) Prior Publication Data

US 2026/0012486 A1 Jan. 8, 2026

(51) Int. Cl.
*H04L 9/40* (2022.01)

(52) U.S. Cl.
CPC .......... *H04L 63/16* (2013.01); *H04L 63/1408* (2013.01)

(58) Field of Classification Search
CPC ..... H04L 63/162; H04L 63/16; H04L 63/164; H04L 63/166; H04L 63/168; H04L 43/10; H04L 63/0272; H04L 63/0485; H04L 63/1408; H04L 63/1425
See application file for complete search history.

(56) References Cited

U.S. PATENT DOCUMENTS 11,418,950 B1 * 8/2022 Sreenivas Hariharan .................. H04L 9/14
2014/0337614 A1 * 11/2014 Kelson .................. H04L 63/166 713/152
2024/0314532 A1 * 9/2024 Kanagarathinam ... H04W 24/08
2025/0245064 A1 * 7/2025 Luan .................. G06F 9/44526
2025/0260572 A1 * 8/2025 Bommana ........... H04L 43/0876

FOREIGN PATENT DOCUMENTS

WO WO-2025173257 A1 * 8/2025 ............. G06F 11/36

OTHER PUBLICATIONS https://www.rgagnon.com/javadetails/java-0453.html—scraped Dec. 2023 from https://web.archive.org/ (Year: 2023).*

* cited by examiner

*Primary Examiner* — Alexander Lagor
*Assistant Examiner* — Brandon Binczak
(74) *Attorney, Agent, or Firm* — Jason A. Smith; Shumaker, Loop & Kendrick, LLP

(57) ABSTRACT

A method for observing encrypted traffic in a Java applications is disclosed. The method includes providing the eBPF program to capture to capture encrypted data from kernel-level read and write operations, and/or Transfer Layer Security (TLS) generated key. The method also includes providing a Java agent to instrument functions involved in TLS key generation and to extract session secrets. Further, the method includes facilitating the Java agent to write session secrets to a non-persistent storage medium, such that the eBPF program reads session secrets from the non-persistent storage medium. Thereafter, the method includes providing a user-space program to receive the encrypted data and session secrets from the eBPF program and decrypt the data for analyzing and tracing the Java application.

20 Claims, 8 Drawing Sheets eBPF PROGRAM
114

```
#INCLUDE <UAPI/LINUX/PTRACE.H>
#INCLUDE <LINUX/SCHED.H>
STRUCT TLS_DATA_T {
  U32 PID;
  CHAR DATA[128];
  CHAR KEY[128];
};
BPF_PERF_OUTPUT(EVENTS);
BPF_HASH(SESSION_KEYS, U32, CHAR[128]);
INT TRACE_SYS_WRITE(STRUCT PT_REGS *CTX, UNSIGNED INT FD, CONST CHAR __USER *BUF, SIZE_T COUNT) {
  U32 PID = BPF_GET_CURRENT_PID_TGID() >> 32;
  IF (FD == 1) { // ASSUME FD 1 CORRESPONDS TO /DEV/NULL WRITES FOR SESSION KEYS
    CHAR KEY[128] = {};
    BPF_PROBE_READ_USER(&KEY, SIZEOF(KEY), BUF);
    SESSION_KEYS.UPDATE(&PID, &KEY);
  } ELSE {
    CHAR DATA[128] = {};
    BPF_PROBE_READ_USER(&DATA, SIZEOF(DATA), BUF);
    CHAR *KEY = SESSION_KEYS.LOOKUP(&PID);
    IF (KEY) {
      STRUCT TLS_DATA_T EVENT = {};
      EVENT.PID = PID;
      __BUILTIN_MEMCPY(EVENT.DATA, DATA, SIZEOF(DATA));
      __BUILTIN_MEMCPY(EVENT.KEY, KEY, SIZEOF(KEY));
      EVENTS.PERF_SUBMIT(CTX, &EVENT, SIZEOF(EVENT));
    }
  }
  RETURN 0;
}
```

FIG. 3B

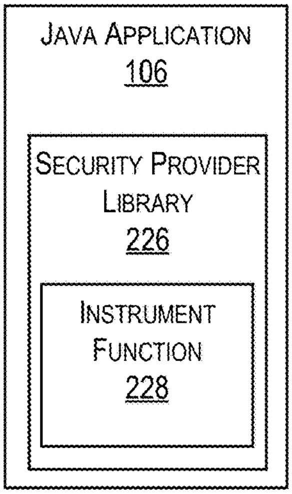

FIG. 4A

JAVA AGENT
116

```
IMPORT JAVA.LANG.INSTRUMENT.CLASSFILETRANSFORMER;
IMPORT JAVA.LANG.INSTRUMENT.INSTRUMENTATION;
IMPORT JAVA.SECURITY.PROTECTIONDOMAIN;
IMPORT JAVASSIST.CLASSPOOL;
IMPORT JAVASSIST.CTCLASS;
IMPORT JAVASSIST.CTMETHOD;
PUBLIC CLASS TLSKEYAGENT {
  PUBLIC STATIC VOID PREMAIN(STRING AGENTARGS, INSTRUMENTATION INST) {
    INST.ADDTRANSFORMER(NEW CLASSFILETRANSFORMER() {
      @OVERRIDE
      PUBLIC BYTE[] TRANSFORM(CLASSLOADER LOADER, STRING CLASSNAME, CLASS<?>
CLASSBEINGREDEFINED,
                  PROTECTIONDOMAIN PROTECTIONDOMAIN, BYTE[] CLASSFILEBUFFER) {
        IF (CLASSNAME.EQUALS("JAVAX/NET/SSL/SSLCONTEXT")) {
          TRY {
            CLASSPOOL CLASSPOOL = CLASSPOOL.GETDEFAULT();
            CTCLASS CTCLASS = CLASSPOOL.GET("JAVAX.NET.SSL.SSLCONTEXT");
            CTMETHOD METHOD = CTCLASS.GETDECLAREDMETHOD("GENERATESESSIONKEY");
            METHOD.INSERTAFTER(
              "{ " +
              "  JAVA.IO.FILEWRITER WRITER = NEW JAVA.IO.FILEWRITER(\"/DEV/NULL\", TRUE); " +
              "  WRITER.WRITE(NEW STRING($1)); " +
              "  WRITER.CLOSE(); " +
              "} "
            );
            RETURN CTCLASS.TOBYTECODE();
          } CATCH (EXCEPTION E) {
            E.PRINTSTACKTRACE();
          }
        }
        RETURN NULL;
      }
    });
  }
}
```

FIG. 4B

User-Space Program
124

```
#Include <Stdio.H>
#Include <Bpf/Libbpf.H>
#Include <Bpf/Bpf.H>
#Include "Tls_Key_Capture.Skel.H"
Void Handle_Event(Void *Ctx, Int Cpu, Void *Data, __U32 Size) {
   Struct Tls_Data_T *Event = Data;
   Printf("Pid: %D, Data: %S, Key: %S\N", Event->Pid, Event->Data, Event->Key);
}
Int Main() {
   Struct Tls_Key_Capture_Bpf *Skel = Tls_Key_Capture_Bpf__Open_And_Load();
   If (!Skel) Return 1;
   If (Tls_Key_Capture_Bpf__Attach(Skel)) Return 1;
   Struct Perf_Buffer *Pb = Perf_Buffer__New(Bpf_Map__Fd(Skel->Maps.Events), 8,
Handle_Event, Null, Null);
   If (!Pb) Return 1;
   While (1) Perf_Buffer__Poll(Pb, 100);
   Perf_Buffer__Free(Pb);
   Tls_Key_Capture_Bpf__Destroy(Skel);
   Return 0;
}
```

FIG. 5

SYSTEM AND METHOD FOR OBSERVING ENCRYPTED TRAFFIC IN JAVA APPLICATIONS USING EBPF AND JAVA AGENT

BACKGROUND

Technical Field

The present disclosure relates to the field of application layer security, and particularly relates to a system and method for observing encrypted traffic in java applications using extended Berkeley Packet Filter (eBPF) and JAVA agent.

Description of the Related Art

The observability of Transport Layer Security (TLS) traffic in Java applications poses a significant challenge due to the unique architecture of the Java Virtual Machine (JVM) and the dynamic nature of Java class loading and Just-In-Time (JIT) compilation. Traditional methods of capturing application data using eBPF (extended Berkeley Packet Filter) probes rely on the ability to attach to known functions or memory addresses, which is relatively straightforward in non-TLS applications or applications using common shared libraries for TLS, such as OpenSSL. However, Java's virtualized environment complicates this approach. Java applications run within a JVM, where application code and libraries are compiled into bytecode and then interpreted or dynamically compiled to native code at runtime by the JIT compiler. This results in several challenges, such as lack of symbol availability (Java functions are not directly available as part of the binary symbols, making it difficult to identify where to attach probes), dynamic memory allocation (the memory addresses of Java methods are not fixed and are only determined during runtime and the JIT compilation process places these methods in an anonymous memory section, further complicating the process of locating the precise memory address for function attachment), and variable security providers (Java allows switching between different security providers, each potentially having its own implementation of encryption and decryption methods, this variability adds another layer of complexity in identifying the correct functions to probe for TLS data capture.

Current solutions involving Java agents aim to instrument Java applications by injecting code into the application functions to capture and potentially modify data. However, these agents face several limitations such as framework dependency (different Java frameworks may utilize different classes and methods for handling TLS, requiring agents to support a wide array of frameworks, which increases the complexity of implementation and maintenance), and performance overhead (Java agents can significantly increase the CPU and memory consumption of an application, as they need to be invoked with every data call and this continuous instrumentation can degrade the overall performance of the application). When using eBPF kernel probes to trace Java TLS applications, the data captured at the kernel level remains encrypted, rendering it unusable for detailed analysis without access to the decrypted data. The inability to effectively capture and decrypt TLS traffic in Java applications without incurring high performance penalties or extensive framework-specific adaptations highlights the need for a more efficient and universally applicable observability solution. This necessity is particularly pressing as secure communication becomes increasingly critical, and the performance overhead associated with existing monitoring solutions can no longer be justified in high-throughput, real-time environments.

Therefore, there is a need for system and method for observing encrypted traffic in java applications using extended Berkeley Packet Filter (eBPF) and Java agent that overcomes the above-mentioned drawbacks.

BRIEF SUMMARY

One or more embodiments are directed to a system, method, and computer program product (together referred to as 'disclosed mechanism') for observing encrypted traffic in java applications using extended Berkeley Packet Filter (eBPF) and Java agent. The disclosed mechanism provides a sophisticated and efficient solution for monitoring encrypted traffic in Java applications, using a combination of eBPF probes and a lightweight Java agent to overcome traditional limitations in observing TLS-encrypted data. Java applications present unique challenges for eBPF-based observability due to their dynamic and virtualized runtime environment, which includes just-in-time (JIT) compilation and diverse security provider implementations that obscure direct access to encryption functions. To address these challenges, the disclosed mechanism employs eBPF probes to capture encrypted data at the kernel level, leveraging the ability of eBPF to attach to kernel functions like sys_read and sys_write. These probes monitor network data as it is transmitted and received, capturing encrypted traffic that would otherwise be inaccessible. Simultaneously, a lightweight Java agent is employed to instrument specific TLS key generation functions within the Java application. This agent is designed to minimally impact performance by only targeting the functions involved in the initial SSL handshake, where session keys are generated. By intercepting these functions, the agent extracts the session keys and writes them to a non-persistent storage medium, such as/dev/null. The disclosed mechanism ensures that session keys are not permanently stored, mitigating security risks while allowing the eBPF probes to read the keys in real-time. The captured session keys are then correlated with the encrypted data by the eBPF program, which sends both the keys and the encrypted data to a user-space program. This user-space program performs the necessary decryption, utilizing the session keys to convert the encrypted data back into its original, readable form. The decrypted data is then used for monitoring, analysis, and troubleshooting purposes.

An embodiment of the present disclosure relates to the system for observing encrypted traffic in Java applications using an extended Berkeley Packet Filter (eBPF) program and Java agent. The system includes an eBPF program module to provide the eBPF program to capture encrypted data from kernel-level read and write operations, TLS generated key, or a combination thereof. In an embodiment, the eBPF program operates at the kernel level to provide visibility independent of the application layer. Further, the eBPF program module maintains connection state information to correlate the encrypted data with the appropriate session secrets.

In an embodiment, the system includes a Java agent module to provide a Java agent to instrument functions involved in TLS key generation and to extract session secrets. The Java agent corresponds to a lightweight program that instruments only the TLS key generation functions to minimize performance impact. Further, the TLS key generation functions are part of the cryptography library and security provider used by the Java application, such that the TLS key generation functions are invoked once during initial SSL handshake of connection which minimizes performance impact due to being a one-time operation.

In an embodiment, the system includes a storage module to facilitate the Java agent to write session secrets to a non-persistent storage medium, such that the eBPF program reads session secrets from the non-persistent storage medium. The non-persistent storage medium is associated with "/dev/null", such that the Java agent writes the session secrets while minimizing impact and security concern. Further, the storage module ensures the security of session secrets during extraction and transfer.

In an embodiment, the system includes a user-space program module to provide a user-space program to receive the encrypted data and session secrets from the eBPF program and decrypt the data for analyzing and tracing the Java application. The user-space program further includes functionality to analyze the decrypted data for performance monitoring, security auditing, and/or troubleshooting purposes.

An embodiment of the present disclosure relates to the method for observing encrypted traffic in Java applications using an extended Berkeley Packet Filter (eBPF) program and Java agent. The method includes the steps of providing the eBPF program to capture encrypted data from kernel-level read and write operations, TLS generated key, or a combination thereof. In an embodiment, the eBPF program operates at the kernel level to provide visibility independent of the application layer. Further, the method includes the steps of maintaining connection state information to correlate the encrypted data with the appropriate session secrets. In an embodiment, the method includes the steps of providing a Java agent to instrument functions involved in TLS key generation and to extract session secrets. The Java agent corresponds to a lightweight program that instruments only the TLS key generation functions to minimize performance impact. Further, the TLS key generation functions are part of the cryptography library and security provider used by the Java application, such that the TLS key generation functions are invoked once during initial SSL handshake of connection which minimizes performance impact due to being a one-time operation.

In an embodiment, the method includes the steps of facilitating the Java agent to write session secrets to a non-persistent storage medium, such that the eBPF program reads session secrets from the non-persistent storage medium. The non-persistent storage medium is associated with "/dev/null", such that the Java agent writes the session secrets while minimizing impact and security concern. Further, the method includes the steps of ensuring the security of session secrets during extraction and transfer. In an embodiment, the method includes the steps of providing a user-space program to receive the encrypted data and session secrets from the eBPF program and decrypt the data for analyzing and tracing the Java application. The user-space program further includes functionality to analyze the decrypted data for performance monitoring, security auditing, and/or troubleshooting purposes.

An embodiment of the present disclosure relates to the computer program product including at least one non-transitory computer-readable storage medium having computer-executable program code portions stored therein. The computer program product is configured to provide the eBPF program to capture encrypted data from kernel-level read and write operations, TLS generated key, or a combination thereof. In an embodiment, the eBPF program operates at the kernel level to provide visibility independent of the application layer. Further, the computer program product is configured to maintain connection state information to correlate the encrypted data with the appropriate session secrets. In an embodiment, the computer program product is configured to provide a Java agent to instrument functions involved in TLS key generation and to extract session secrets. The Java agent corresponds to a lightweight program that instruments only the TLS key generation functions to minimize performance impact. Further, the TLS key generation functions are part of the cryptography library and security provider used by the Java application, such that the TLS key generation functions are invoked once during initial SSL handshake of connection which minimizes performance impact due to being a one-time operation.

In an embodiment, the computer program product is configured to facilitate the Java agent to write session secrets to a non-persistent storage medium, such that the eBPF program reads session secrets from the non-persistent storage medium. The non-persistent storage medium is associated with "/dev/null", such that the Java agent writes the session secrets while minimizing impact and security concern. Further, the computer program product is configured to ensure the security of session secrets during extraction and transfer. In an embodiment, the computer program product is configured to provide a user-space program to receive the encrypted data and session secrets from the eBPF program and decrypt the data for analyzing and tracing the Java application. The user-space program further includes functionality to analyze the decrypted data for performance monitoring, security auditing, and/or troubleshooting purposes.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3B illustrates an exemplary eBPF program, in accordance with an embodiment of the present disclosure.

FIG. 4A an exemplary Java application, in accordance with an embodiment of the present disclosure.

FIG. 4B an exemplary Java agent, in accordance with an embodiment of the present disclosure.

FIG. 5 illustrates an exemplary user-space program, in accordance with an embodiment of the present disclosure.

Figure 1:
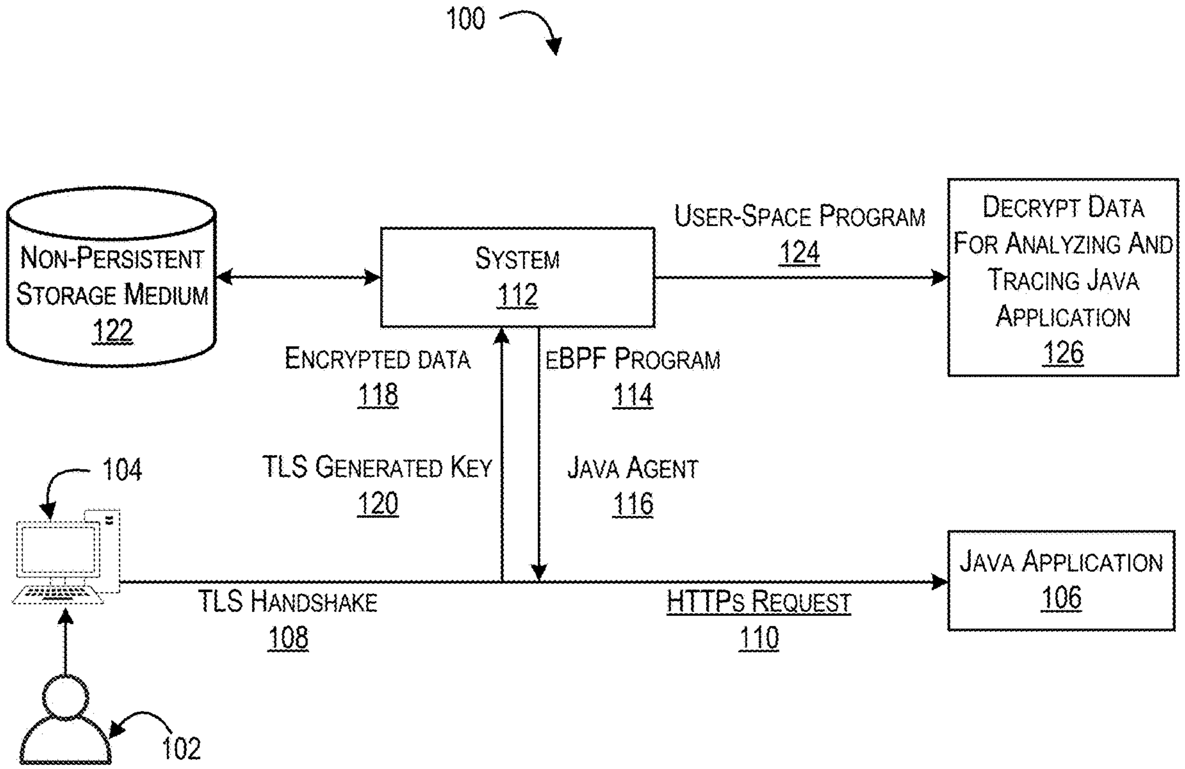
FIG. 1 illustrates an exemplary environment having a system for observing encrypted traffic in Java applications using an extended Berkeley Packet Filter (eBPF) program and Java agent, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system, method, and computer program product (together referred to as 'disclosed mechanism') for observing encrypted traffic in Java applications using an extended Berkeley Packet Filter (eBPF) program and Java agent. The disclosed mechanism may provide the eBPF program to capture to capture encrypted data from kernel-level read and write operations, and/or Transfer Layer Security (TLS) generated key. Further, the disclosed mechanism may provide a Java agent to instrument functions involved in TLS key generation and to extract session secrets. Furthermore, the disclosed mechanism may facilitate the Java agent to write session secrets to a non-persistent storage medium, such that the eBPF program reads session secrets from the non-persistent storage medium. Thereafter, the disclosed mechanism may provide a user-space program to receive the encrypted data and session secrets from the eBPF program and decrypt the data for analyzing and tracing the Java application.

FIG. 1 illustrates an exemplary environment 100 having a system 112 for observing encrypted traffic in Java applications 106 using an extended Berkeley Packet Filter (eBPF) program 114 and Java agent 116, in accordance with an embodiment of the present disclosure.

In an embodiment, the exemplary environment 100 may include a user 102 with a corresponding user device 104 accessing the Java application 106. It may be apparent to a person skilled in the art that one user 102 and one user device 104 have been disclosed merely for the illustrative purpose and the environment 100 may include one or more users and one or more user devices without departing from the scope of the present disclosure. Further, the connection between the user device 104 and the java application 106 may, without any limitation, be through a network (such as a communication network), such as a direct interconnection, a Local Area Network (LAN), a Wide Area Network (WAN), a wireless network (e.g., using Wireless Application Protocol), the Internet, and the like. Further, the user devices 104 may, without any limitation, mobile phones, computers, laptops, tablets, routers, switches, hubs, firewalls, printers, hosts, servers, wireless access points, or the like. During the accessing of the Java application 106 by the user device 104, one or more TLS handshake 108 and one or more HTTPs requests 110 may be exchanged.

Figure 2A:
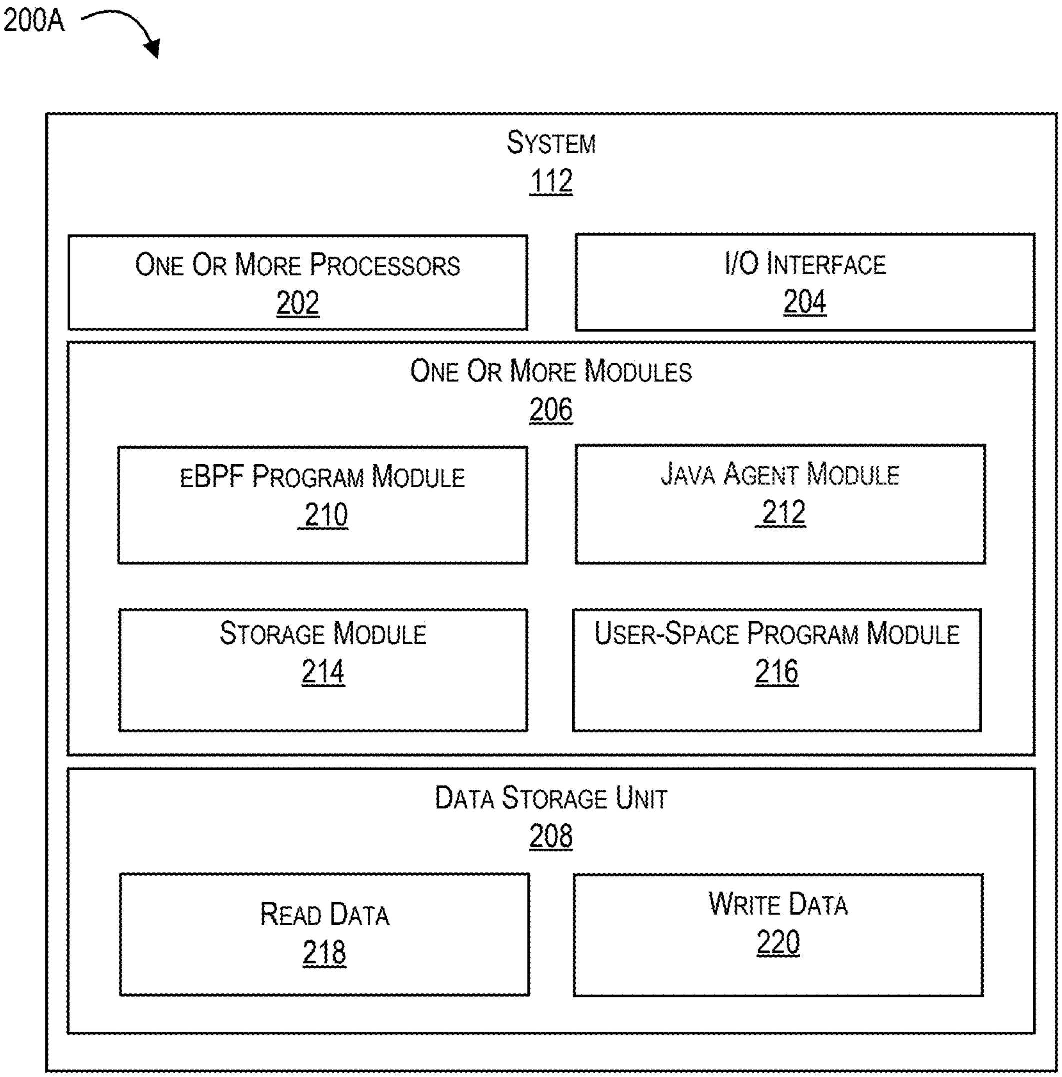
FIG. 2A illustrates a block diagram of the system for observing the encrypted traffic in the Java applications using the eBPF program and the Java agent, in accordance with an embodiment of the present disclosure.
Figure 2B:
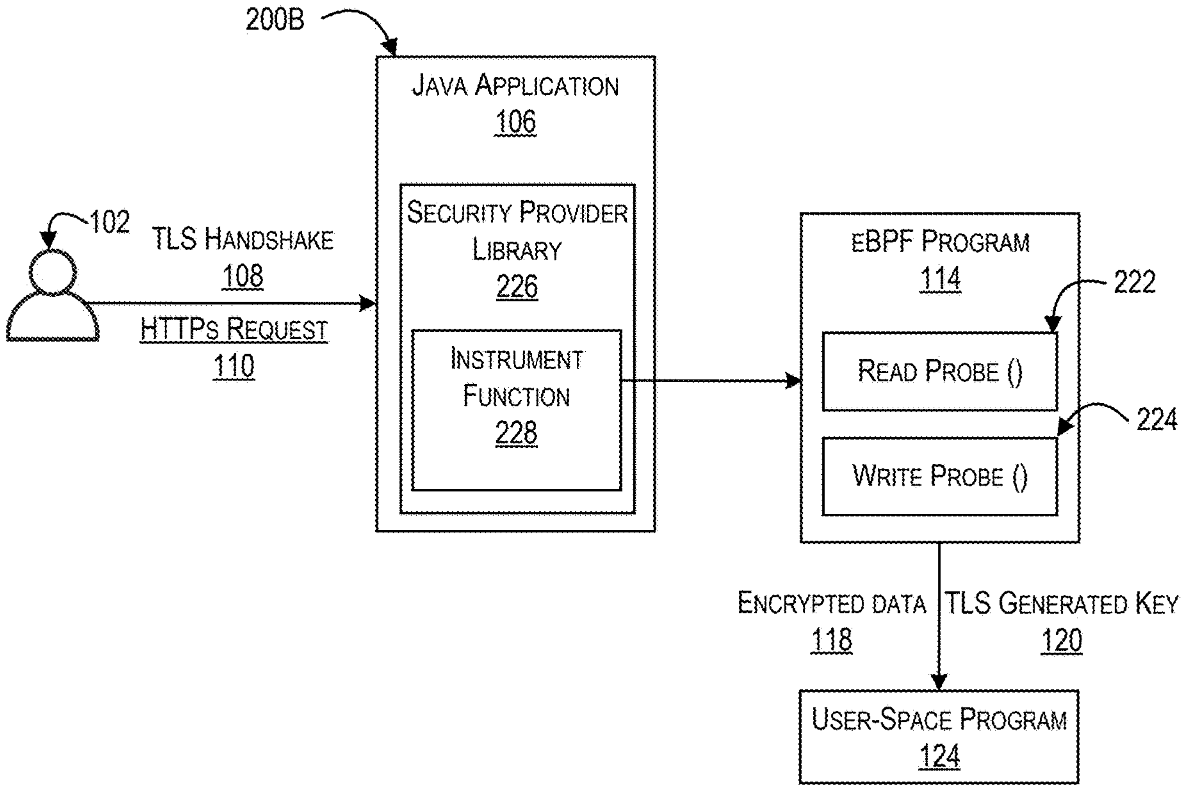
FIG. 2B illustrates a flow diagram of an operation of the system for observing the encrypted traffic in the Java applications using the eBPF program and the Java agent, in accordance with an embodiment of the present disclosure.
Figure 3A:
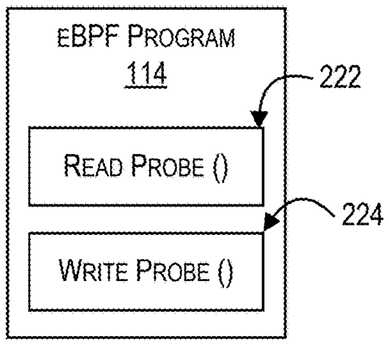
FIG. 3A illustrates a high level exemplary eBPF program, in accordance with an embodiment of the present disclosure.

Further, the system 112 may be communicatively coupled to monitor the connection between the user device 104 and the Java application 106 for monitoring encrypted traffic in the java application 106, using a combination of the eBPF program 114 and a lightweight Java agent 116. The eBPF program 114 may capture encrypted data 118 at the kernel level and/or TLS generate key 120. By leveraging the ability of the eBPF programs 114 to attach to kernel functions like sys_read and sys_write, the system 112 may monitor network data as it is transmitted and received, capturing encrypted traffic that would otherwise be inaccessible. Simultaneously, the lightweight Java agent 116 may instrument specific TLS key generation functions within the Java application 106. The Java agent 116 may be designed to minimally impact performance by only targeting the functions involved in the initial SSL handshake, where session keys are generated. By intercepting these functions, the Java agent 106 may extract the session keys and writes them to a non-persistent storage medium 122, such as/dev/null. The system 112 may ensure that session keys are not permanently stored, mitigating security risks while allowing the eBPF programs 114 to read the keys in real-time. The captured session keys may then be correlated with the encrypted data by the eBPF program 114, which sends both the keys and the encrypted data to a user-space program 124. The user-space program 124 may perform the necessary decryption, utilizing the session keys to convert the encrypted data back into its original/readable form i.e. decrypted form, as shown by block 126. The decrypted data may then be used for monitoring, analysis, and troubleshooting purposes FIG. 2A illustrates a block diagram 200A of the system 112 for observing the encrypted traffic in the Java application 106 using the eBPF program 114 and the Java agent 116, in accordance with an embodiment of the present disclosure. FIG. 2B illustrates a flow diagram 200B of an operation of the system 112 for observing the encrypted traffic in the Java application 106 using the eBPF program 114 and the Java agent 116, in accordance with an embodiment of the present disclosure. FIG. 3A illustrates a high level exemplary eBPF program 114, in accordance with an embodiment of the present disclosure. FIG. 3B illustrates an exemplary eBPF program 114, in accordance with an embodiment of the present disclosure. FIG. 4A an exemplary Java application 106, in accordance with an embodiment of the present disclosure. FIG. 4B an exemplary Java agent 116, in accordance with an embodiment of the present disclosure. FIG. 5 illustrates an exemplary user-space program 124, in accordance with an embodiment of the present disclosure. For the sake of brevity, FIGS. 2A, 2B, 3A, 3B, 4A, 4B, and 5 have been explained together.

In an embodiment, the system 112 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 112 with its external environment for facilitating the exchange of information between the system 112 and its users or external devices. Furthermore, the I/O interface 204 may contribute to the user experience by providing intuitive means for input, such as through keyboards or touchscreens, and presenting meaningful output via displays or other output devices. In an embodiment, the one or more modules 206 may include an eBPF program module 210, a Java agent module 212, a storage module 214, and a user-space program module 216, and any other module essential or required for the working of the system 112. In an embodiment, the data storage unit 208 may include the HTTP requests, read data 218, write data 220, and any other data required for the working of the system 106. In an embodiment of the present disclosure, the one or more processors 202 and the data storage unit 208 may form a part of a chipset installed in the system 112. In another embodiment of the present disclosure, the data storage unit 208 may be implemented as a static memory or a dynamic memory. In an example, the data storage unit 208 may be internal to the system 112, such as an onside-based storage. In another example, the data storage unit 208 may be external to the system 112, such as cloud-based storage. Further, the one or more module 206 may be communicatively coupled to the data storage unit 208 and the one or more processor 202 of the system 112. The one or more processors 202 may be configured to control the operations of the one or more modules 206.

In an embodiment, the eBPF program module 210 may provide the eBPF program 114 to capture encrypted data from kernel-level read 218 and write 220 operations, TLS generated key 120, or a combination thereof. In an embodiment, the eBPF program 114 may operates at the kernel level to provide visibility independent of the application layer. Further, the eBPF program module 210 may maintain connection state information to correlate the encrypted data with the appropriate session secrets. Accordingly, the eBPF program module 210 may provide a powerful and flexible mechanism for capturing and analyzing network traffic (including the encrypted data) at the kernel level through the eBPF program module 210 that allows for the dynamic insertion of bytecode into various hooks within the Linux kernel, enabling detailed monitoring and analysis of system calls and network events with minimal performance overhead. In an exemplary embodiment, in the context of the present disclosure, the eBPF program 210 may be designed to hook into the sys_read and sys_write system calls and thus, may include read probe 222 and write probe 224, as shown in FIG. 3A.

In an exemplary embodiment, as illustrated in FIG. 3B, the eBPF program 114 is 'tls_key_capture.bpf.c' that hooks into the 'sys_write' system call to capture TLS session keys and encrypted data in the Java application 106. The eBPF program 114 may first define a data structure, 'tls_data_t', to store the process ID (PID), captured data, and session key. It may also sets up a perf buffer (events) for communication between the kernel and user space, and a hash map (session_keys) to store session keys indexed by the PID. Also, the core functionality may be in the 'trace_sys_write' function, which may be triggered whenever a write operation occurs. This function may check if the file descriptor (fd) is 1, which may be assumed to correspond to write to/dev/null for session keys. In case of yes, the session key may read from user space and stored in the hash map with the PID as the key. In case of no, the function may read the encrypted data from user space, looks up the corresponding session key from the hash map, and construct an event containing the PID, data, and key. This event may then be submitted to the user space through the perf buffer. In an embodiment, the user-space program 124 may interact with the eBPF program 114 to load and attach the eBPF program 114 and set up a perf buffer to receive events, and enters a loop to poll the buffer. When an event may be received, the 'handle_event' callback function may be invoked, which prints the PID, captured data, and session key. This setup may allow real-time capturing and decryption of TLS-encrypted traffic in the Java application 106 by combining kernel-level eBPF monitoring with lightweight user-space handling.

In an embodiment, the Java agent module 212 may provide the Java agent 116 to instrument functions involved in TLS key generation and to extract session secrets. The Java agent 116 may correspond to a lightweight program that instruments only the TLS key generation functions to minimize performance impact. Further, the TLS key generation functions may be part of the cryptography library and security provider used by the Java application 106, such that the TLS key generation functions may be invoked once during initial SSL handshake of connection which minimizes performance impact due to being a one-time operation. In an embodiment, the Java application 106 may, without any limitation, include security provider library 226 and instrument function 228, as shown in FIG. 4A. In an exemplary embodiment, as illustrated in FIG. 4B, the Java agent 116 in the present disclosure may be a lightweight program designed to intercept and extract TLS session keys during the SSL handshake process in Java applications. The Java agent 116 may use the Java Instrumentation API, which allows for bytecode manipulation of classes loaded in the JVM. When the Java agent 116 is loaded, it may register a 'ClassFileTransformer' that may modify specific classes and methods related to TLS key generation. In this example, the Java agent 116 may target the 'javax.net.ssl.SSLContext' class responsible for generating session keys. The 'ClassFileTransformer' may use a library like 'Javassist' to insert bytecode into the targeted method. This bytecode may write the session keys to '/dev/null', the non-persistent storage medium, ensuring that the keys are not permanently stored on the file system, thus mitigating security risks. The eBPF program 114 may then reads these keys from the kernel-level write operations to '/dev/null'. This approach allows the system 112 to capture session keys with minimal performance impact since the instrumentation occurs only during the initial SSL handshake, a relatively infrequent operation compared to the continuous data transmission. By focusing solely on the key generation phase, the Java agent 116 may avoid the performance overhead typically associated with continuous instrumentation, making it an efficient and secure solution for capturing TLS session keys in the Java application 106.

In an embodiment, the storage module 214 may handle the transient storage of TLS session keys during the data capturing process and may operate at the interface between the Java agent 116 and the eBPF program 114, ensuring that session keys are temporarily available without being persistently stored on the file system. Accordingly, the storage module 214 may facilitate the Java agent 116 to write session secrets to the non-persistent storage medium 122, such that the eBPF program 114 reads session secrets from the non-persistent storage medium 122. The non-persistent storage medium 122 may be associated with "/dev/null", such that the Java agent 116 writes the session secrets while minimizing impact and security concern. When the Java agent 116 intercepts the key generation process during the SSL handshake, it writes the session keys to the non-persistent storage medium, such as/dev/null. This location is selected because write to/dev/null do not result in actual data being stored, thus maintaining security and preventing any sensitive information from being saved on disk. The eBPF program 114, hooked into the kernel's write operations, may monitors these write to/dev/null, capturing the session keys in real-time as they pass through the kernel. By using this transient storage approach, the storage module 214 may ensures that the session keys are available just long enough for the eBPF program 114 to capture them, facilitating the subsequent decryption of encrypted traffic without leaving any sensitive data at rest. Accordingly, the storage module 214 significantly reduces the risk of key exposure and ensure that the system 112 remains secure while providing the necessary data for effective monitoring and analysis of TLS-encrypted traffic in Java applications. As a result, the storage module 214 may ensure the security of session secrets during extraction and transfer.

In an embodiment, the user-space program module 216 may be responsible for interfacing with the eBPF program 114 and performing the decryption and analysis of the captured encrypted data. The user-space program module 216 may acts as a bridge between the kernel-level eBPF probes and the end-user, ensuring that the data collected by the eBPF program is processed and presented in a usable form. Further, the user-space program module 216 provide the user-space program 124 to receive the encrypted data and session secrets from the eBPF program 114 and decrypt the data for analyzing and tracing the Java application 106. The user-space program 124 may further include functionality to analyze the decrypted data 126 for performance monitoring, security auditing, and/or troubleshooting purposes. In operation, the user-space program 124 loads the compiled eBPF bytecode and attaches it to the relevant kernel hooks, such as the sys_read and sys_write system calls. It sets up a perf buffer to receive events from the eBPF program 114, which include the encrypted data and corresponding session keys. The program enters a loop, continuously polling the perf buffer for new events. When an event is detected, the user-space program 124 may retrieve the session keys and encrypted data and uses the keys to decrypt the data, and then logs or processes the decrypted data as needed. This real-time processing may allow for immediate visibility into the application's traffic, facilitating monitoring and troubleshooting. The user-space program module 216 may ensure seamless and efficient communication with the kernel, handling the complexities of encryption and decryption, and providing a clear and accessible output for administrators and security personnel.

In an exemplary embodiment, as illustrated in FIG. 5, the user-space program 124 is 'tls_capture.c' that complements the eBPF program 114 by managing the loading, attachment, and data handling of the eBPF code. It begins by including necessary libraries such as bpf/libbpf.h for BPF functions and tls_key_capture.skel.h, which is a header generated by the bpftool that may include the compiled eBPF program and map definitions. The program's main function may start by loading the eBPF skeleton using tls_key_capture_bpf_open_and_load( ). If the loading fails, the program exits with an error. Upon successful loading, the program may attache the eBPF program 114 to the relevant kernel hooks using tls_key_capture_bpf_attach( ). Any failure in attachment may also result in the program's termination. Next, the program may sets up a perf buffer with perf_buffer_new( ), linking it to the events map defined in the eBPF program 114. The perf buffer may be configured to call the handle_event function whenever an event is received. The handle_event function may be a callback that processes the data passed from the eBPF program 114. Each event may contain the PID, captured encrypted data, and the corresponding session key. Inside this function, the event data is printed to the console, displaying the PID, data, and key. The main function may then enter an infinite loop, continuously polling the perf buffer with perf_buffer_poll( ). This allows the program to handle events in real-time, ensuring that all encrypted data and session keys captured by the eBPF program 114 are processed and outputted promptly. The loop is designed to run indefinitely, keeping the program active for continuous monitoring. Upon termination, resources such as the perf buffer and the eBPF skeleton may be freed. Accordingly, the user-space program 124 may effectively bridge the kernel-level eBPF monitoring and user-level data handling, providing a complete solution for capturing and decrypting TLS traffic in the Java application 106.

Figure 6:
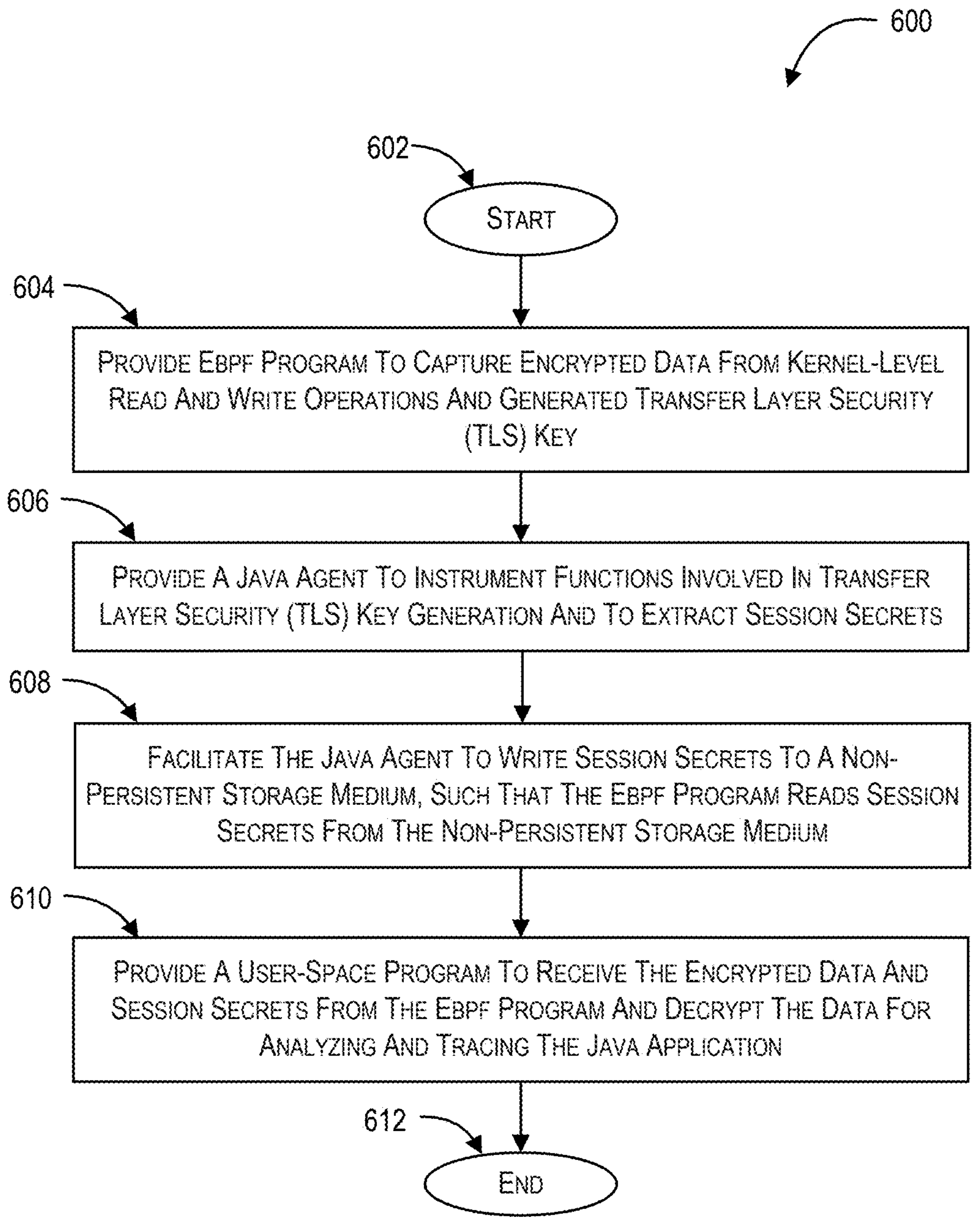
FIG. 6 is a flow chart of a method for observing encrypted traffic in Java applications using the eBPF program and Java agent, in accordance with an embodiment of the present disclosure.

FIG. 6 is a flow chart 600 of a method for observing encrypted traffic in Java applications using the eBPF program and Java agent, in accordance with an embodiment of the present disclosure. The method starts at step 602.

At first, the eBPF program may be provided, at step 604, to capture encrypted data from kernel-level read and write operations, TLS generated key, or a combination thereof. In an embodiment, the eBPF program operates at the kernel level to provide visibility independent of the application layer. Further, the method may include the steps of maintaining connection state information to correlate the encrypted data with the appropriate session secrets.

Next, at step 606, a Java agent may be provided to instrument functions involved in TLS key generation and to extract session secrets. The Java agent corresponds to a lightweight program that instruments only the TLS key generation functions to minimize performance impact. Further, the TLS key generation functions are part of the cryptography library and security provider used by the Java application, such that the TLS key generation functions are invoked once during initial SSL handshake of connection which minimizes performance impact due to being a one-time operation.

Next, at step 608, the Java agent may be facilitated to write session secrets to a non-persistent storage medium, such that the eBPF program reads session secrets from the non-persistent storage medium. The non-persistent storage medium is associated with "/dev/null", such that the Java agent writes the session secrets while minimizing impact and security concern. Further, the method includes the steps of ensuring the security of session secrets during extraction and transfer.

Thereafter, at step 610, a user-space program may be provided to receive the encrypted data and session secrets from the eBPF program and decrypt the data for analyzing and tracing the Java application. The user-space program further includes functionality to analyze the decrypted data for performance monitoring, security auditing, and/or troubleshooting purposes.

Figure 7:
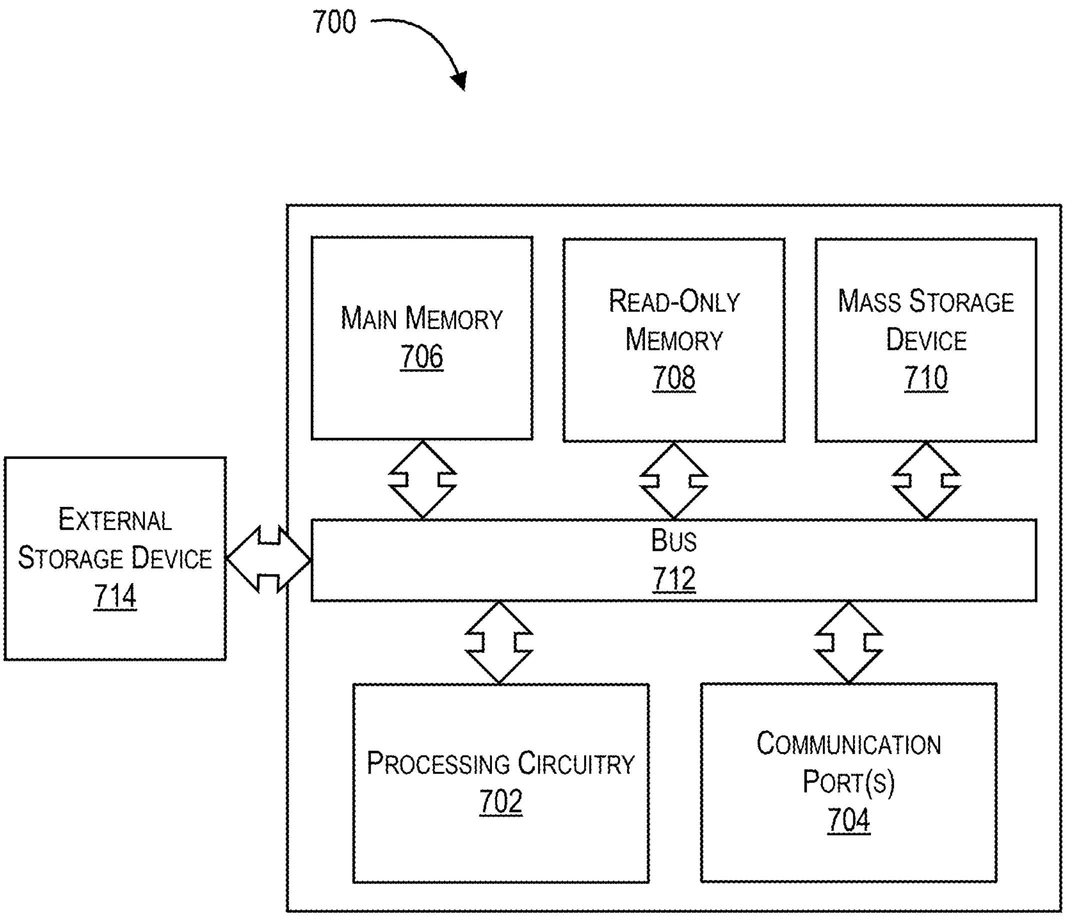
FIG. 7 illustrates an exemplary computer unit in which or with which embodiments of the present disclosure may be utilized.

FIG. 7 illustrates an exemplary computer system in which or with which embodiments of the present disclosure may be utilized. As shown in FIG. 7, a computer system 700 includes an external storage device 714, a bus 712, a main memory 706, a read-only memory 708, a mass storage device 710, a communication port 704, and a processor 702.

Those skilled in the art will appreciate that computer system 900 may include more than one processor 702 and communication ports 704. Examples of processor 702 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 702 may include various modules associated with embodiments of the present disclosure.

The communication port 704 can be any of an RS-232 port for use with a modem-based dialup connection, a 10/100 Ethernet port, a Gigabit or 10 Gigabit port using copper or fiber, a serial port, a parallel port, or other existing or future ports. The communication port 704 may be chosen depending on a network, such as a Local Area Network (LAN), Wide Area Network (WAN), or any network to which the computer system connects.

The memory 706 can be Random Access Memory (RAM), or any other dynamic storage device commonly known in the art. Read-Only Memory 708 can be any static storage device(s) e.g., but not limited to, a Programmable Read-Only Memory (PROM) chips for storing static information e.g., start-up or BIOS instructions for processor 702.

The mass storage 710 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 712 communicatively couples processor(s) 702 with the other memory, storage, and communication blocks. The bus 712 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 702 to a software system.

Optionally, operator and administrative interfaces, e.g., a display, keyboard, and a cursor control device, may also be coupled to bus 704 to support direct operator interaction with the computer system. Other operator and administrative interfaces can be provided through network connections connected through communication port 704. An external storage device 710 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system for observing encrypted traffic in a Java application, the system comprising:

one or more processors; and a memory storing instructions that, when executed by the one or more processors, cause the system to:

capture, by an extended Berkeley Packet Filter (eBPF) program, encrypted data from kernel-level read and write operations associated with the Java application;

instrument, by a Java agent, functions involved in Transfer Layer Security (TLS) key generation;

extract, by the Java agent, session secrets from the functions;

write, by the Java agent, the session secrets to a non-persistent storage medium;

capture, by the eBPF program, the session secrets from a kernel-level write operation directed to the non-persistent storage medium;

receive, by a user-space program and from the eBPF program, the encrypted data and the session secrets; and decrypt, by the user-space program, the encrypted data for analyzing and tracing the Java application.

2. The system of claim 1, wherein the non-persistent storage medium is associated with "/dev/null".

3. The system of claim 1, wherein the eBPF program maintains connection state information that correlates the encrypted data with the appropriate session secrets.

4. The system of claim 1, wherein the Java agent corresponds to a lightweight program that instruments only the TLS key generation functions.

5. The system of claim 4, wherein the TLS key generation functions are part of the cryptography library and security provider used by the Java application, such that the TLS key generation functions are invoked once during initial SSL handshake of the connection.

6. The system of claim 1, wherein the eBPF program operates at a kernel level.

7. The system of claim 1, wherein the non-persistent storage medium is configured such that the session secrets are not persistently stored after the kernel-level write operation directed to the non-persistent storage medium.

8. The system of claim 1, wherein the user-space program further analyzes the decrypted data for at least one of: performance monitoring, security auditing, and troubleshooting purposes.

9. A method for observing encrypted traffic in a Java application, the method comprising:

capturing, by an extended Berkeley Packet Filter (eBPF) program, encrypted data from kernel-level read and write operations associated with the Java application;

instrumenting, by a Java agent, functions involved in Transfer Layer Security (TLS) key generation;

extracting, by the Java agent, session secrets from the functions;

writing, by the Java agent, session secrets to a non-persistent storage medium;

capturing, by the eBPF program, the session secrets from a kernel-level write operation directed to the non-persistent storage medium;

receiving, by a user-space program and from the eBPF program, the encrypted data and the session secrets; and decrypting, by the user-space program, the encrypted data for analyzing and tracing the Java application.

10. The method of claim 9, wherein the non-persistent storage medium is associated with "/dev/null".

11. The method of claim 9, further comprising maintaining connection state information that correlates the encrypted data with the appropriate session secrets.

12. The method of claim 9, wherein the Java agent corresponds to a lightweight program that instruments only the TLS key generation functions.

13. The method of claim 12, wherein the TLS key generation functions are part of the cryptography library and security provider used by the Java application, such that the TLS key generation functions are invoked once during initial SSL handshake of the connection.

14. The method of claim 9, wherein the eBPF program operates at a kernel level.

15. The method of claim 9, wherein the non-persistent storage medium is configured such that the session secrets are not persistently stored after the kernel-level write operation directed to the non-persistent storage medium.

16. The method of claim 9, wherein the user-space program further analyzes the decrypted data for at least one of: performance monitoring, security auditing, and troubleshooting purposes.

17. A computer program product including at least one non-transitory computer-readable storage medium having computer-executable program code portions stored therein, the computer program product is configured to:

capture, by an extended Berkeley Packet Filter (eBPF) program, encrypted data from kernel-level read and write operations associated with a Java application;

instrument, by a Java agent, functions involved in Transfer Layer Security (TLS) key generation;

extract, by the Java agent, session secrets from the functions;

write, by the Java agent, session secrets to a non-persistent storage medium;

capture, by the eBPF program, session secrets from a kernel-level write operation directed to the non-persistent storage medium;

receive, by a user-space program and from the eBPF program, the encrypted data and the session secrets; and decrypt, by the user-space program, the encrypted data for analyzing and tracing the Java application.

18. The computer program product of claim 17, wherein the non-persistent storage medium is associated with "/dev/null;

wherein the Java agent corresponds to a lightweight program that instruments only the TLS key generation functions;

wherein the TLS key generation functions are part of the cryptography library and security provider used by the Java application, such that the TLS key generation functions are invoked once during initial SSL handshake of the connection;

wherein the eBPF program operates at a kernel level; and wherein the user-space program further analyzes the decrypted data for at least one of: performance monitoring, security auditing, and troubleshooting purposes.

19. The computer program product of claim 17, further configured to maintain connection state information that correlates the encrypted data with the appropriate session secrets.

20. The computer program product of claim 17, wherein the non-persistent storage medium is configured such that the session secrets are not persistently stored after the kernel-level write operation directed to the non-persistent storage medium.

* * * * *